United States Patent [19]
Nakazeki

[11] Patent Number: 6,102,822
[45] Date of Patent: Aug. 15, 2000

[54] PULLEY

[75] Inventor: Tsugito Nakazeki, Kuwana, Japan

[73] Assignee: NTN Corporation, Osaka-Fu, Japan

[21] Appl. No.: 09/150,210

[22] Filed: Sep. 9, 1998

[30] Foreign Application Priority Data

Sep. 30, 1997 [JP] Japan ..................... 9-266408

[51] Int. Cl.⁷ .............. F16H 55/36; F16C 33/38
[52] U.S. Cl. .............. 474/199; 474/903; 384/523
[58] Field of Search ................ 474/199, 198, 474/166, 903; 384/450, 523, 527, 531, 543, 546, 547, 526

[56] References Cited

U.S. PATENT DOCUMENTS

| | | | |
|---|---|---|---|
| 3,918,778 | 11/1975 | Jacobson et al. | 384/523 |
| 4,040,686 | 8/1977 | F'Geppert | 384/523 |
| 5,553,949 | 9/1996 | Fukuwaka et al. | 384/523 |
| 5,728,020 | 3/1998 | Muranaka et al. | 474/199 |
| 5,941,704 | 8/1999 | Arai et al. | 384/523 |

*Primary Examiner*—David A. Bucci
*Assistant Examiner*—Matthew A. Kaness
*Attorney, Agent, or Firm*—Arent Fox Kintner Plotkin & Kahn

[57] ABSTRACT

A ball bearing cage fitted in a pulley main body having peripheral surface to be contacted by a belt. The pulley bearing includes a raceway surface and grease. The cage has pockets for receiving balls which are circumferentially disposed with unequal pitch such that when some of the vibrating balls impart channeling to the grease on the raceway surface, the other balls ride on the grease on the raceway surface. This suppresses or prevents the occurrence of cold peculiar sound.

4 Claims, 4 Drawing Sheets

(1 of 4 Drawing Sheet(s) Filed in Color)

PULLEY

BACKGROUND OF THE INVENTION

The present invention relates chiefly to a pulley, which entrains a belt, such as the timing belt or a belt for driving an auxiliary machine, driven by an automobile engine.

Pulleys are used for belts, such as the timing belts and belts for driving auxiliary machines, driven by automobile engines and disposed to increase the wrapping angle of the belt and impart a suitable tension to the belt. FIG. 6 shows an example of arrangement of a timing belt, wherein an endless belt E is entrained around a driving pulley A fixed to a crank shaft, driven pulleys B, B fixed on cam shafts, a tensioner pulley C rotatably mounted on a fixed shaft and an idler pulley D. Of these pulleys, the pulleys C and D mounted on fixed shafts are usually bearing-equipped pulleys having bearings installed in the inner portions thereof.

If the aforesaid bearing-equipped pulleys are driven in a cold climate, they sometimes produce a peculiar sound (whistle sound) depending on the pulley specifications and operating conditions. Such peculiar sound in a cold climate, or the so-called cold peculiar sound, does not always occur in the market; rather, it depends on the temperature, etc., and in Japan it occurs only in very limited districts (Hokkaido, etc.). Further, it occurs for a very short time (1 minute at most) following the start of the engine of an automobile; thereafter, there is no such sound. Further, the sound is frequently produced when a single row deep groove ball bearing is used as the ball bearing, and the rate of occurrence decreases when a double row angular ball bearing is used.

Cold peculiar sound has such complicated properties and can hardly be reproduced, a fact which accounts for the fact that its cause of occurrence has not yet been clearly analyzed. Furthermore, the pulleys used in automobiles are operated at high temperature and at high speed and their durability is also an important property, so that a measure which leads to a lowering of durability cannot be adopted.

For this reason there is provided at present no effective means worthy of mention which can be used as a cold peculiar pulley sound preventive measure.

Conventionally, as a cold peculiar sound preventive measure, investigations are made as to the use of a grease which is superior in low temperature properties (a grease which, even in a cold climate, forms oil films uniformly on the areas of contact between the rolling bodies and the raceway surfaces of the inner and outer rings). This preventive means is intended to effectively suppress the occurrence of cold peculiar sound by enhancing the lubricating performance of grease in a cold climate, and a substantial effect can be expected. However, since the NLGI consistency number of grease decreases, there is anxiety about the lubricating performance in a hot climate, possibly leading to a lowering of durability.

SUMMARY OF THE INVENTION

Accordingly, the present invention is intended to provide a means which effectively suppresses or prevents the occurrence of cold peculiar sound while retaining the functions of pulleys and taking durability and cost into account.

The applicant has observed some phenomena shown below in cold peculiar sound reproducing tests.

(1) The pulley (the outer ring of the bearing) is axially vibrating during occurrence of cold peculiar sound. Further, this frequency component agrees with the frequency of the cold peculiar sound.

(2) When there is no cold peculiar sound occurring, this frequency component is not observed.

(3) The frequency component during occurrence of cold peculiar sound is the same in phase at two 180° measured positions on the pulley end surface.

According to analysis of these observed phenomena, it has been found that the source of occurrence of cold peculiar sound is the bearing and that a major cause is the self-exited vibration of the bearing due to the gyroscopic moment of the balls. This vibration is remarkable when the damping of the grease is low.

The present invention is intended to effectively suppress the self-exited vibration of a bearing as a cold peculiar sound preventive measure on the basis of this reasoning and provides an arrangement comprising a pulley main body having a pulley peripheral surface contacted by a belt, and a ball bearing fitted to the pulley main body, wherein the cage of the ball bearing is an unequal disposition cage in which pockets for receiving balls are circumferentially disposed with an unequal pitch.

It has been observed from the cold peculiar sound reproducing tests that the frequency of cold peculiar sound is an integral multiple of the passage frequency of the ball, i.e., the number of balls passing through a specified point on the inner ring during a unit time. This is believed to be due to the fact that channeling lowers the damping coefficient of grease. On the other hand, if the cage is the unequal disposition cage as described above, balls roll while riding on the grease on the rolling surface, so that the damping action due to the grease can be sufficiently secured. Therefore, it becomes possible to prevent occurrence of peculiar sound.

FIGS. 7 and 8 are graphs showing the results of comparative tests conducted to prove the effect of the present invention. In the comparative tests, a pulley having a ball bearing incorporated therein is pushed against a belt to measure the frequency of the axial vibration of the ball bearing while gradually increasing the rpm. FIG. 7 shows the results for the equal disposition cage and FIG. 8 for the unequal disposition cage. As is clear from the two figures, for the unequal disposition cage, the axial vibration of the bearing is very weak, so that it is believed possible to prevent the occurrence of cold peculiar sound even under cold peculiar sound producing conditions.

As for the unequal disposition cage, it is preferable that central angles between adjoining pockets be of 2 kinds, one being a central angle a and the other a central angle b, satisfying the following relation:

$$b/a=(n+2)/(n+1) \text{ where } n=\text{the integers } 1, 2, \ldots 6.$$

It has been clearly shown that the frequency of the abnormal vibration with respect to the passage frequency of the balls is empirically about 6 times at most. Therefore, in order to reliably prevent the cold peculiar sound, it is preferable to determine the central angles a and b with n=6 in the above relation.

In the above cage, it is desirable to use a snap-on type cage of resin such that the peripheral edge of the pocket is shaped like a concave spherical surface, one axial side of the pocket serving as an annular base, the other axial side having an opening.

According to the invention, the balls roll while riding on the grease on the rolling surface at the start in a cold climate and the damping action of the enclosed grease effectively suppresses the self-excited vibration of the bearing and therefore it is possible to suppress or prevent the occurrence of cold peculiar sound. This effect can be obtained regardless of the kind of the grease, and therefore, unlike the conventional pulley using a grease superior in low temperature properties, there in no danger of leading to a lowering of the high temperature durability. Further, since the occurrence of cold peculiar sound can be effectively suppressed or prevented by means of the simple arrangement, the invention is advantageous also from the viewpoint of cost.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DESCRIPTION OF THE PREFERRED EMBODIMENTS

Figure 1:
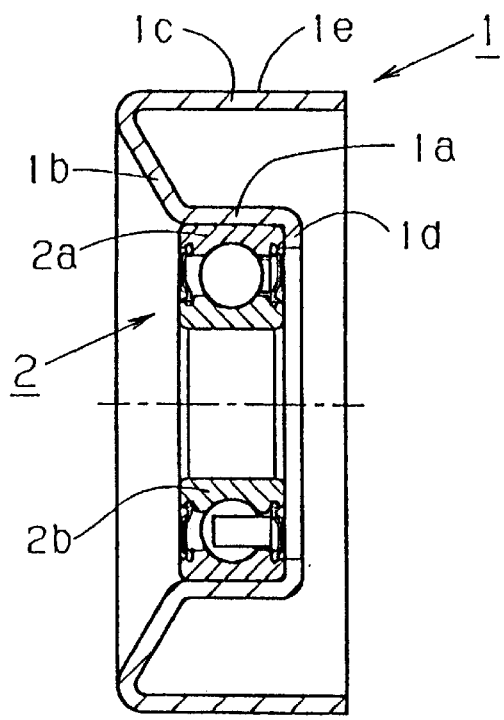
FIG. 1 is a sectional view of a bearing-equipped pulley.

A pulley shown in FIG. 1 is an idler pulley used with a driving belt for an auxiliary device of an automobile, comprising a pulley main body 1 made by pressing a steel sheet, a single row ball bearing 2 fitted in the pulley main body 1. The pulley main body 1 is an annular body comprising a cylindrical portion 1a, a flange portion 1b radially outwardly extending from one end of the cylindrical portion 1a, an outer cylindrical portion 1c axially extending from the flange portion 1b, and a flange portion 1d radially inwardly extending from the other end of the cylindrical portion 1a. The cylindrical portion 1a has the outer ring 2a of a ball bearing 2 fitted therein, while the outer cylindrical portion 1c is externally provided with a pulley peripheral surface 1e to be contacted by an unillustrated belt. This pulley peripheral surface 1e is contacted by the unillustrated belt, so that the pulley performs the role of an idler pulley.

Figure 2:
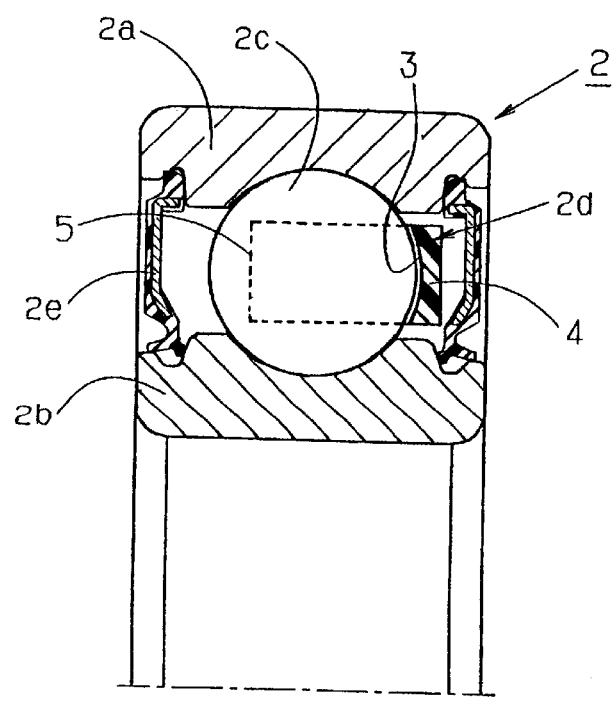
FIG. 2 is a sectional view of the ball bearing in FIG. 1.

As shown in FIG. 2, the ball bearing 2 comprises an outer ring 2a fitted in the cylindrical portion 1a of the pulley main body 1, an inner ring 2b fitted on an unillustrated fixed shaft, a plurality of balls 2c incorporated between the raceway surfaces of the inner and outer rings 2b and 2a, a cage 2d for retaining the balls 2c, and a pair of seals 2e for holding grease.

Figure 3:
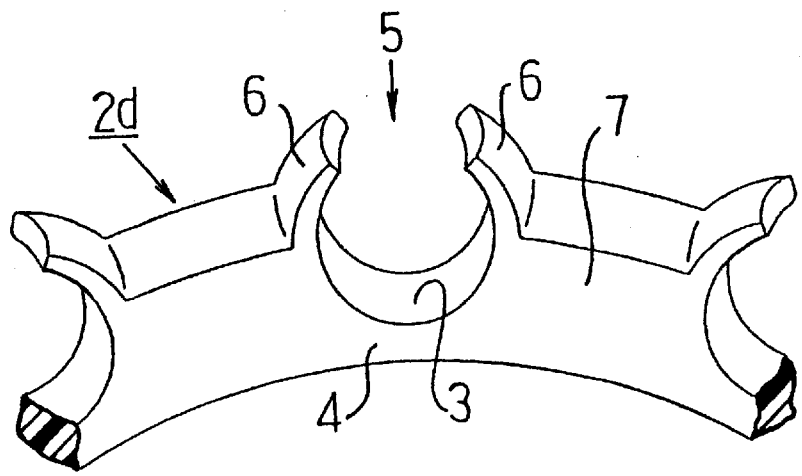
FIG. 3 is a fragmentary perspective view of a snap-on type cage of resin.

As shown in FIG. 3, the cage 2d is of the snap-on type which called crown-shaped type, made, for example, by injection-molding synthetic resin, said cage having pockets 3 whose peripheral edges are shaped like concave spherical surfaces for receiving balls 2c in a plurality of circumferentially spaced places, one axial side of the pocket 3 defining an annular base 4, the other axial side having an opening 5. The pockets 3 are partitioned by column portions 7 and the opening 5 is defined by a pair of pawls 6 arcuately extending from the front ends of adjoining column portions 7. The opening 5 is smaller than the diameter of the ball 3 and the pawls 6 are formed to have thin walls to enable the pawls to be elastically deformed. In incorporation, the front ends of pairs of pawls 6 are pushed against the balls 2c incorporated between the raceway surfaces of the inner and outer rings 2b and 2a to elastically spread the openings 5 apart by the balls 2c, thereby receiving the balls 2c in the pockets 3. After receiving the balls 2c, the pairs of elastically restored pawls 6 prevent the balls 2c from dropping off.

Figure 4:
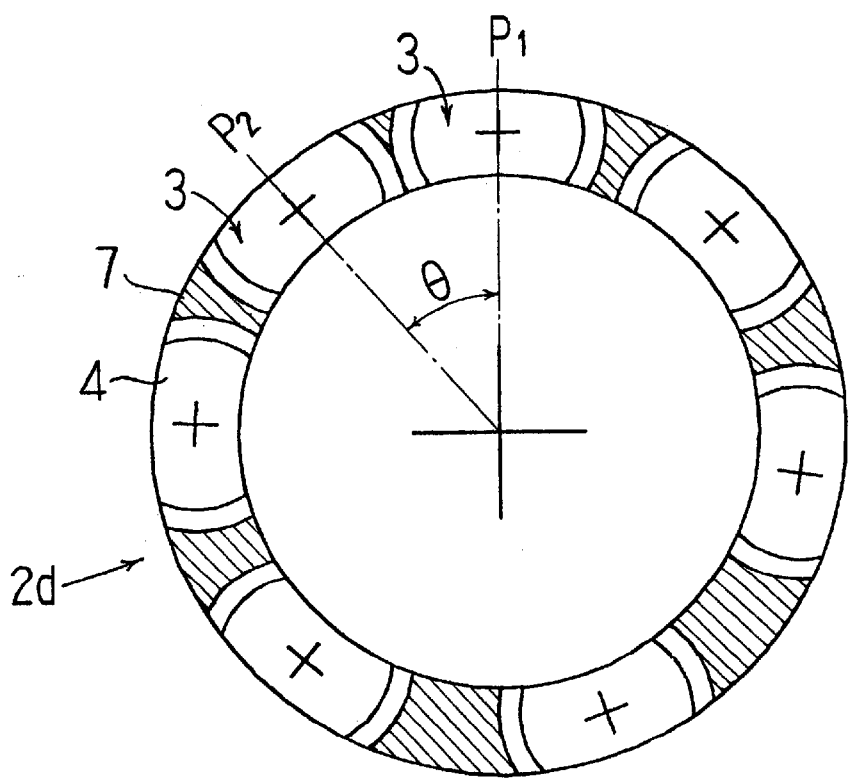
FIG. 4 is a sectional view showing an embodiment of the invention.

According to the present invention, in said cage 2d, the pockets 3, which are disposed usually with a circumferential equal pitch are disposed with an unequal pitch as shown in FIG. 4 (unequal disposition cage). In the drawings, four kinds of central angles θ between adjoining pockets (the angles each defined between the centerlines p1 and p2 of adjoining pockets) are illustrated by way of example. The number of kinds of central angles θ is optional, as long as it is 2 or above. If the pockets 3 are unequally disposed in this manner, the ball 2c roll while riding on the grease on the rolling surface as described above, so that the abnormal vibration of the outer ring can be prevented by the damping action of the grease.

Figure 5:
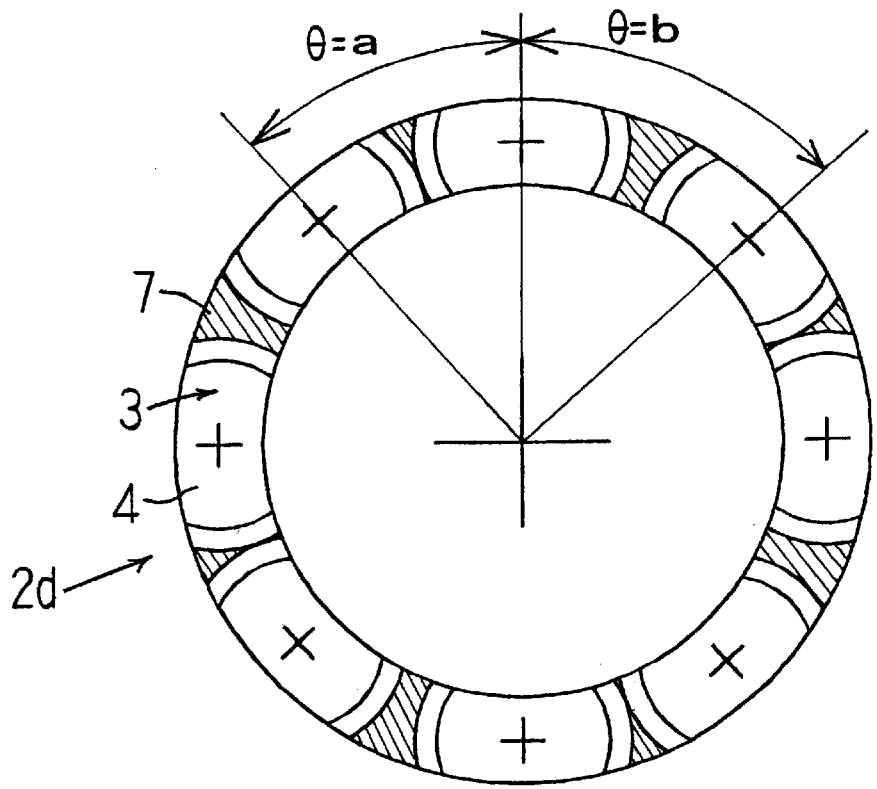
FIG. 5 is a sectional view showing another embodiment of the invention.

FIG. 5 shows an embodiment wherein the central angles θ are of two kinds a and b which are alternately disposed. These angles a and b are set such that they satisfy the following relation:

$$b/a = (n+2)/(n+1)$$

where n means a scale factor defined by the ratio of the maximum frequency of the abnormal vibration to the passage frequency (described above) of the ball and is optionally selected from the integers 1, 2, . . . 6. For example, if the maximum value of the frequency of the abnormal vibration actually measured is found to be 5 times the ball passage frequency, n=5 is substituted in the above relation, whereby the relationship between a and b can be found. If n=5, then b/a is 1.17. Therefore, in the case of a bearing having 8 balls 2c, the occurrence of abnormal vibration of the balls 2c, i.e., the cold peculiar sound can prevented by setting the central angle a at 41° and the central angle b at 48°.

In this case, even if the a is any one of the integers from 1 to 5, the b is never an integer as is clear from the following table.

| a | 1 | 2 | 3 | 4 | 5 |
|---|---|---|---|---|---|
| b | 1.17 | 2.34 | 3.51 | 4.68 | 5.85 |

Therefore, the passage frequency of at least some of the balls is never an integral multiple of the maximum frequency of the abnormal vibration, and the abnormal vibration of the balls 2c can be reliably prevented. In other words, there is no possibility of all the balls rolling along the same path, so that even if some of the balls impart channeling by means of the grease on the raceway surfaces, the other balls pass over the grease while riding on the latter, so that the grease applies a high damping force thereto.

Since it is clear that the frequency of the abnormal vibration is empirically at most about 6 times the passage frequency of the ball, in order to reliably prevent cold peculiar sound it is preferable to determine the central angles a and k with n=6 in the above relation.

Figure 6:
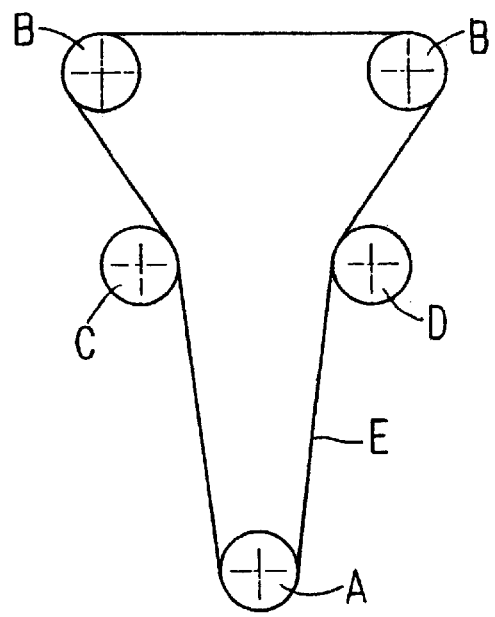
FIG. 6 is a front view showing an example of the disposition of a timing belt.
Figure 7:
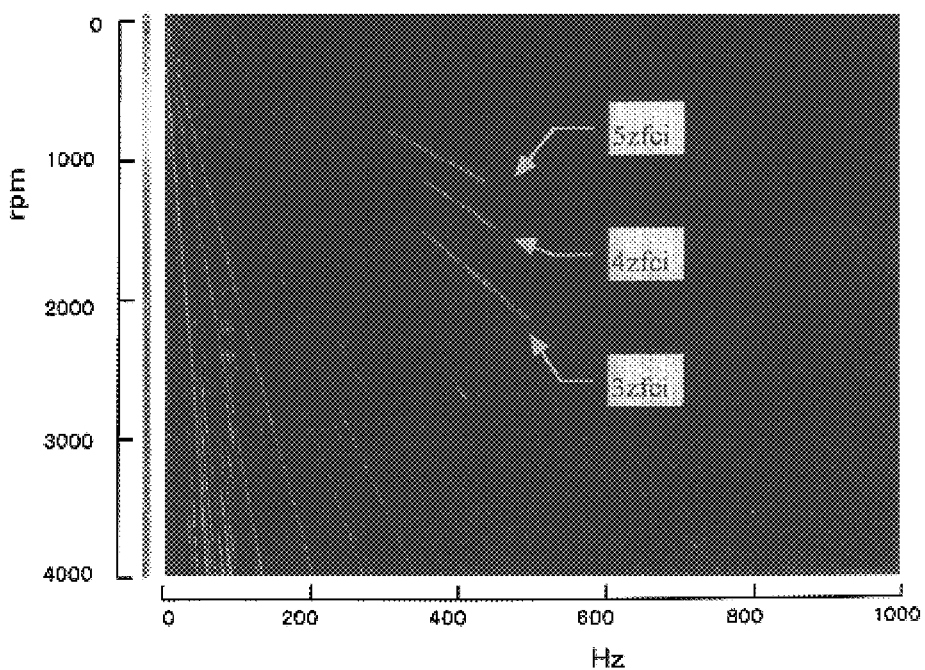
FIG. 7 is a graph showing the results of measurements of the relationship between the rpm of a pulley and the frequency of the axial vibration of a bearing (equal disposition cage)
Figure 8:
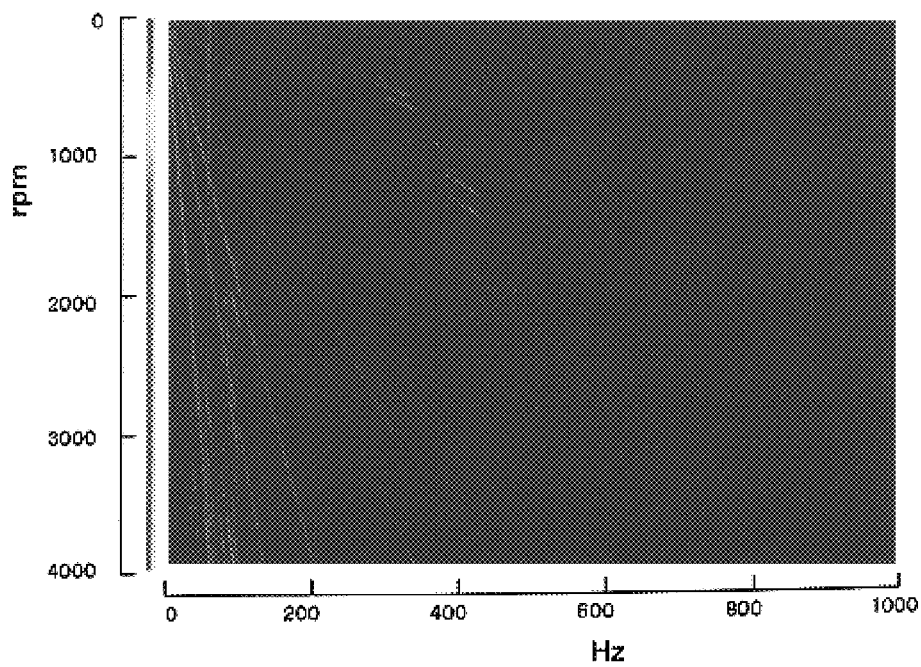
FIG. 8 is a graph showing the results of measurements of the relationship between the rpm of a pulley and the frequency of the axial vibration of a bearing (unequal disposition cage).

The effect of the invention can be attained not only in a ball bearing having an even number of balls but also in a ball bearing having an odd number of balls, as long as the resulting unbalance does not become a problem. Further, it is not absolutely necessary to alternately dispose 2 kinds of central angles a and b, and they may be disposed in any desired manner. Further, the invention is not limited to an idler pulley D (see FIG. 6) but it may be applied to a tensioner pulley C (in the same figure).

Generally in an unequal disposition cage, there is anxiety about operability during incorporation of balls 2c. However, for a snap-on type cage of resin, a difference of 10% or so in central angle does not become a problem, incurring no possibility of the operability being greatly decreased. The present invention is applicable not only to snap-on type cages of resin but also to, e.g., a corrugated iron plate cage, in which case, however, it is desirable that the number of kinds of central angles θ be as small as possible in consideration of pitch alignment in assembling operation.

What is claimed is:

1. A pulley comprising a pulley main body having a pulley peripheral surface contacted by a belt, and a ball bearing fitted to the pulley main body and including a cage having a plurality of pockets, a plurality of balls received in the pockets, a raceway surface on which the balls roll, and grease, wherein the pockets for receiving balls are circumferentially disposed with an unequal pitch such that when some of the vibrating balls impart channeling to the grease on the raceway surface, the other balls ride on the grease on the raceway surface.

2. A pulley as set forth in claim 1, characterized in that central angles between adjoining pockets are of two kinds, one being a central angle a and the other a central angle b, satisfying the following relation:

$$b/a = (n+2)/(n+1) \text{ where } n = \text{the integers } 1, 2, \ldots 6.$$

3. A pulley as set forth in claim 2, wherein n=6.

4. A pulley as set forth in any one of claims 1 through 3, characterized in that the cage is a snap-on cage made of resin designed such that a peripheral edge of the pocket is shaped like a concave spherical surface, one axial side of the pocket serving as an annular base, the other axial side having an opening and having a pair of elastically deformable pawls on the pocket opening side.

* * * * *